Sept. 4, 1962   F. G. MAROS ETAL   3,052,590
HEAT-SEAL APPARATUS AND PROCESS
Filed April 9, 1959
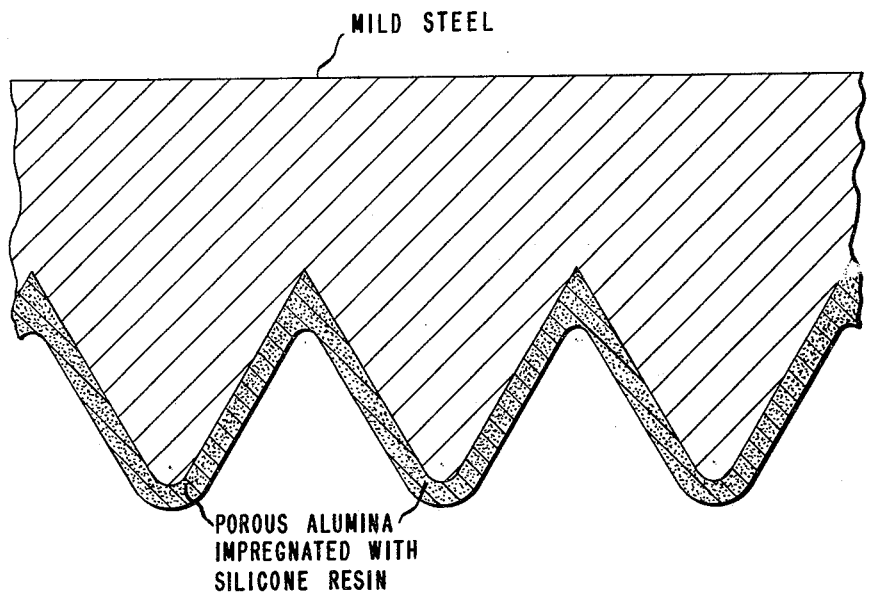
INVENTORS
FRANK GEORGE MAROS
PAUL GLENN STEPHAN
BY
ATTORNEY 3,052,590
HEAT-SEAL APPARATUS AND PROCESS
Frank George Maros, Wilmington, Del., and Paul Glenn Stephan, Landenburg, Pa., assignors to E. I. du Pont de Nemours and Company, Wilmington, Del., a corporation of Delaware
Filed Apr. 9, 1959, Ser. No. 805,259
2 Claims. (Cl. 156—289)

This invention relates to the heat sealing of flexible, pellicular structures of thermoplastic organic polymeric material, and more particularly to improvements in apparatus used for the heat sealing of surfaces of vinylidene chloride copolymers and like thermoplastic organic polymers.

In heat sealing packages of films which have been coated with a heat-sealable vinylidene choloride copolymer coating such as described in Pitzl U.S.P. 2,570,478, Hauser U.S.P. 2,462,185, etc., on machines such as make-and-fill or bag machines, the heat-sealable coating sticks to the jaws of the sealing element causing jamming, inadequate seals and corrosion of the machine parts.

An object of this invention is to provide a heat-sealing element having an improved contacting surface for sealing together surfaces of thermoplastic organic polymeric material, e.g., surfaces of vinylidene chloride copolymers. Another object is to provide a process for treating the contacting surfaces of heat-sealing elements whereby to substantially inhibit sticking of the contacting surface of the sealing element to heat-sealable surfaces of thermoplastic organic polymeric material, and to enhance the effective life of the contacting surfaces. These and additional objects will more clearly appear hereinafter.

The foregoing objects are realized by the present invention which, briefly stated, comprises forming on the contacting surface of a heat-sealing element of steel, an adherent porous coating of alumina, impregnating said coating with a thermosetting (heat-hardenable) silicone resin, and thereafter heating said impregnated coating at a temperature and for a time effective to cure (harden) said resin whereby to form a contacting surface consisting of a hard, wear-resistant, porous coating of alumina firmly bonded to a base of steel, the pores of said coating being filled with cured silicone resin.

In the preferred embodiment of this invention the adherent porous coating of alumina is achieved by the conventional flame or thermal-spraying technique wherein a mixture comprised of powdered alumina (or any other metal, metal alloy or metal oxide suitable for coating) suspended in a gaseous mixture of oxygen and acetylene, contained in a chamber provided with a suitable spray nozzle, is ignited and the resulting flame, containing the alumina particles heated to the plastic stage, is sprayed from the nozzle over the surface to be coated. The coating so produced is, in effect, welded to the base material and is characterized by having a fine porous structure having excellent wear resistance. For purposes of this invention best results are obtained when the base material upon which the coating is formed is of mild steel, the surface of which has been roughened and cleaned by grit-blasting, grinding or the like. A minimum coating thickness of 0.003" is required to secure a uniform coating. A coating thickness of approximately 0.005" appears optimum.

In place of alumina, other ceramic materials may be employed such as titania and zirconia, or the porous cating may be formed from other flame-sprayable substances such as Nichrome, tungsten carbide, or any of the available metal alloys which are especially formulated for flame-spray application.

The thermosetting resins which may be employed as pore fillers herein include a variety of well-known silicone resins such as the alkyl, aryl, aroxyaryl, aroxyalkyl and vinyl silicone resins fully described in the prior art. For example, suitable resins are disclosed in U.S. Patents Nos. 2,258,218, 2,258,220, 2,258,221 and 2,258,222 in the name of E. G. Rochow. The temperature and time required to effect a cure of the resin will, of course, depend upon the specific silicone resin employed.

Although the present invention is applicable to, and improves the effectiveness of the metallic contacting surface of any heat-sealing device irrespective of the contour of such surface, the problem of sticking mentioned hereinabove is most pronounced with the serrated heat-sealing jaws customarily employed in making crimp seals, and the invention will be further described specifically in connection with serrated sealing surfaces, and with reference to the accompanying drawing wherein is illustrated, in a cross-sectional view, a segment of a typical serrated heat-sealing jaw which has been treated in accordance with the process of this invention under the following illustrative conditions:

Mild steel serrated jaw surfaces, such as shown in the drawing, were first roughened by air blasting with No. 80 steel grit or alumina particles. Powdered alumina (Metco No. 101, Metallizing Engineering Company, Inc., Westbury, New York) was then flame-sprayed onto the jaws, using conventional flame-spraying equipment well-known in the trade. The jaw surfaces were passed under the flame spray at a speed and angle to lay down an alumina coating approximately 0.005" thick having the desired porosity. The alumina-coated surfaces were then soaked with the silicone resin (Dow Corning R–671 Silicone Resin, Dow Corning, Midland, Michigan), resulting in impregnation and coating of the porous coating, and allowed to air dry for at least 15 minutes, after which the impregnated surfaces were heated at 475° F. for one hour to cure the resin. The resulting surfaces showed no tendency to adhere to vinylidene chloride copolymer-coated film under normal heat-sealing conditions, even after months of service; and no appreciable wear on the treated jaws was observed.

This invention makes it possible to seal vinylidene chloride copolymer coated films, cellulose acetate films, nitrocellulose coated films, polyethylene terephathalate films, and like heat-sealable films on crimp seal machines such as make-and-fill or bag machines, without having the coating or film adhere to the heat-sealing jaws or causing corrosion. Silicone compounds are, of course, well-known as release agents, but when applied to uncoated jaws, adhere only a short time, then sticking occurs. The present invention obviates this difficulty.

We claim:

1. In heat sealing apparatus for sealing together surfaces of thermoplastic organic polymeric material comprising a sealing element of heat-conductive material a surface of which is adapted to contact and heat the thermoplastic surfaces to be sealed, the improvement which comprises as the heat-conductive sealing element a body of steel having an adherent, porous coating of alumina the pores of which are filled with a cured thermosetting silicone resin, said coating having a thickness of at least 0.003 of an inch.

2. A process for improving the contacting surfaces of heat-sealing elements comprised of steel which comprises forming on said surfaces of steel an adherent, porous coating of alumina having a thickness of at least 0.003 of an inch, impregnating said porous coating with a thermosetting silicone resin, and thereafter heating the impregnated coating at a temperature and for a time effective to cure said resin whereby to form a contacting surface consisting of a porous coating of alumina firmly bonded to a base of steel, the pores of said coating being filled with cured silicone resin.

References Cited in the file of this patent

UNITED STATES PATENTS

| | | |
|---|---|---|
| 2,320,999 | Beebe | June 8, 1943 |
| 2,574,094 | Fener et al. | Nov. 6, 1951 |
| 2,609,316 | Fichtner | Sept. 2, 1952 |
| 2,686,654 | Roush | Aug. 17, 1954 |
| 2,709,569 | Roush | May 31, 1955 |
| 2,762,724 | Brennan | Sept. 11, 1956 |
| 2,775,531 | Montgomery et al. | Dec. 25, 1956 |
| 2,850,828 | Sullivan | Sept. 9, 1958 |

OTHER REFERENCES

Ziegler: Abstract of application Serial Number 664,668, published November 21, 1950, 640 O.G. 1032. Copy in 117—Organic Silicone Digest.